United States Patent [19]

Bullard et al.

[11] Patent Number: 5,989,725
[45] Date of Patent: Nov. 23, 1999

[54] CLEAR HIGH MOLECULAR WEIGHT FILM

[75] Inventors: Edward M. Bullard, Rochester; Thomas A. White, Farmington, both of N.Y.

[73] Assignee: Tenneco Packaging, Evanston, Ill.

[21] Appl. No.: 08/785,003

[22] Filed: Jan. 16, 1997

[51] Int. Cl.⁶ .................................................. B32B 27/32
[52] U.S. Cl. ....................................................... 428/516
[58] Field of Search ........................ 525/240; 526/348.1; 428/35.2, 515, 516, 212, 213, 215

[56] References Cited

U.S. PATENT DOCUMENTS

| | | | |
|---|---|---|---|
| 3,645,992 | 2/1972 | Elston | 260/80.78 |
| 3,986,611 | 10/1976 | Dreher | 206/386 |
| 4,011,382 | 3/1977 | Levine et al. | 526/96 |
| 4,050,221 | 9/1977 | Lancaster, III et al. | 53/211 |
| 4,076,698 | 2/1978 | Anderson et al. | 526/348.6 |
| 4,163,831 | 8/1979 | Gessell | 526/153 |
| 4,205,021 | 5/1980 | Morita et al. | 525/240 |
| 4,302,565 | 11/1981 | Goeke et al. | 526/88 |
| 4,302,566 | 11/1981 | Karol et al. | 526/125 |
| 4,359,561 | 11/1982 | Fraser et al. | 526/88 |
| 4,399,173 | 8/1983 | Anthony et al. | 428/35 |
| 4,399,180 | 8/1983 | Briggs et al. | 428/212 |
| 4,418,114 | 11/1983 | Briggs et al. | 428/218 |
| 4,461,873 | 7/1984 | Bailey et al. | 525/240 |
| 4,511,609 | 4/1985 | Craver et al. | 428/35 |
| 4,514,465 | 4/1985 | Schoenberg | 428/339 |
| 4,522,987 | 6/1985 | Hogan et al. | 526/106 |
| 4,565,720 | 1/1986 | Yaeo et al. | 428/35 |
| 4,574,104 | 3/1986 | Aishima et al. | 428/220 |
| 4,588,650 | 5/1986 | Mientus et al. | 428/516 |
| 4,808,561 | 2/1989 | Welborn, Jr. | 502/104 |
| 4,833,017 | 5/1989 | Benoit | 428/323 |
| 4,871,523 | 10/1989 | Datta et al. | 423/265 |
| 4,871,705 | 10/1989 | Hoel | 502/117 |
| 4,925,821 | 5/1990 | Chang | 502/107 |
| 4,925,825 | 5/1990 | Tachi et al. | 502/309 |
| 4,937,301 | 6/1990 | Chang | 526/128 |
| 5,001,205 | 3/1991 | Hoel | 526/128 |
| 5,006,500 | 4/1991 | Chang | 502/107 |
| 5,017,655 | 5/1991 | Kase et al. | 525/127 |
| 5,019,315 | 5/1991 | Wilson | 264/171 |
| 5,026,798 | 6/1991 | Canich | 526/127 |
| 5,032,652 | 7/1991 | Chang | 526/129 |
| 5,049,423 | 9/1991 | German, Jr. | 428/352 |
| 5,079,205 | 1/1992 | Canich | 502/117 |
| 5,084,534 | 1/1992 | Welborn, Jr. et al. | 526/160 |
| 5,085,927 | 2/1992 | Dohrer | 428/220 |
| 5,110,663 | 5/1992 | Nishiyama et al. | 428/195 |
| 5,124,418 | 6/1992 | Welborn, Jr. | 526/114 |
| 5,173,343 | 12/1992 | Arvedson et al. | 428/34.9 |
| 5,183,867 | 2/1993 | Welborn, Jr. | 526/114 |
| 5,206,075 | 4/1993 | Hodgson, Jr. | 428/216 |
| 5,248,547 | 9/1993 | Wilson | 428/218 |
| 5,272,016 | 12/1993 | Ralph | 428/516 |
| 5,273,809 | 12/1993 | Simmons | 428/212 |
| 5,278,272 | 1/1994 | Lai et al. | 526/348.5 |
| 5,279,872 | 1/1994 | Ralph | 428/34.9 |
| 5,283,128 | 2/1994 | Wilhoit | 428/516 |
| 5,296,580 | 3/1994 | Matsunaga et al. | 528/502 |
| 5,334,428 | 8/1994 | Dobreski et al. | 428/34.9 |
| 5,358,792 | 10/1994 | Mehta et al. | 428/516 |
| 5,374,459 | 12/1994 | Mumpower et al. | 428/36.7 |
| 5,376,439 | 12/1994 | Hodgson et al. | 428/220 |
| 5,380,810 | 1/1995 | Lai et al. | 526/352 |
| 5,382,631 | 1/1995 | Stehling et al. | 525/240 |
| 5,395,471 | 3/1995 | Obijeski et al. | 156/244.11 |
| 5,397,613 | 3/1995 | Georgelos | 428/36.7 |
| 5,397,640 | 3/1995 | Georgelos et al. | 428/349 |
| 5,399,426 | 3/1995 | Koch et al. | 428/335 |
| 5,407,732 | 4/1995 | Dokurno | 428/213 |
| 5,419,795 | 5/1995 | Wood et al. | 156/184 |
| 5,419,934 | 5/1995 | Wilson | 428/34.9 |
| 5,420,220 | 5/1995 | Cheruvu et al. | 526/348.1 |
| 5,431,284 | 7/1995 | Wilson | 206/597 |
| 5,451,450 | 9/1995 | Erderly et al. | 428/220 |
| 5,451,468 | 9/1995 | Seiler et al. | 428/515 |
| 5,460,861 | 10/1995 | Vicik et al. | 428/34.9 |
| 5,462,807 | 10/1995 | Halle et al. | 428/500 |
| 5,482,770 | 1/1996 | Bekele | 428/339 |
| 5,482,771 | 1/1996 | Shah | 428/349 |
| 5,491,019 | 2/1996 | Kuo | 428/213 |
| 5,523,136 | 6/1996 | Fischer et al. | 428/35.2 |
| 5,530,065 | 6/1996 | Farley et al. | 525/240 |
| 5,543,223 | 8/1996 | Shah | 428/349 |
| 5,558,930 | 9/1996 | DiPoto | 428/216 |
| 5,591,390 | 1/1997 | Walton et al. | 264/456 |
| 5,595,050 | 1/1997 | Koch et al. | 53/441 |
| 5,617,707 | 4/1997 | Simmons | 53/441 |
| 5,665,800 | 9/1997 | Lai et al. | 524/115 |
| 5,681,523 | 10/1997 | Cobler et al. | 464/565 |
| 5,749,202 | 5/1998 | Eichbauer | 53/399 |
| 5,752,362 | 5/1998 | Eichbauer | 53/399 |

FOREIGN PATENT DOCUMENTS

| | | |
|---|---|---|
| 0 600 425 | 11/1993 | European Pat. Off. . |
| WO 92/17539 | 10/1992 | WIPO . |
| WO 94/14855 | 7/1994 | WIPO . |
| WO 94/25271 | 11/1994 | WIPO . |
| WO 94/26816 | 11/1994 | WIPO . |

OTHER PUBLICATIONS

ASTM D 2457–90, Standard Test Method for Specular Gloss of Plastic Films and Solid Plastics, Jun. 1990.
ASTM D 1922–93, Standard Test Method for Propigation Tear Resistance of Plastic Films and Thin Sheeting by Pendulum Method, Dec. 1993.

(List continued on next page.)

Primary Examiner—Paul Thibodeau
Assistant Examiner—D. Lawrence Tarazano
Attorney, Agent, or Firm—Arnold White & Durkee

[57] ABSTRACT

A polymeric multilayer film is disclosed that has improved optical qualities while having structural qualities that are not significantly compromised. The film is composed of outer film layers of a low polydispersity polymer which are placed around at least one inner film layer of a high molecular weight high density polyethylene (HDPE) polymer. The outer film layer polymer has a polydispersity of from about 1 to about 4. In a preferred embodiment this low polydispersity polymer is formed in the presence of a metallocene catalyst. The inner film layer high molecular weight HDPE polymer has a melt index of less than 0.1 and a density of at least about 0.940 g/cm³. Any of the layers of the film may be constructed of polymer blends.

35 Claims, No Drawings

OTHER PUBLICATIONS

ASTM D 1709–91, Standard Test Method for Impact Resistance of Plastic Film by the Free–Falling Dart Method, Mar. 1991.

ASTM D 1003–92 Standard Test Method for Haze and Luminous Transmittance of Transparent Plastics, Oct. 1992.

Chowdhury, et al., "Polymers by Blueprint: Metallocene catalysts, the biggest thing to hit plastics since LLDPE, transform workhorse resins into engineering plastics," *Chemical Engineering* (Apr. 1993), pp. 34–39.

Schut, "Competition for Metallocenes Could Turn Ugly," *Plastics World* (Jan. 1995), pp. 33–36.

Advantages of Matallocene Ethylene Polymer Resins in Blown and Cast Stretch Films, Research Disclosure, pp. 539–545, Aug. 1995.

Advantages of Metallocene Ethylene Polymer Resin Blends in Cast Film, Research Disclosure, pp. 556–557, Aug. 1995.

Advantages of Metallocene Ethylene Polymer Resin Blends in Blown and Cast Films, Research Disclosure, pp. 565–573, Aug. 1995.

Leaversuch, Robert D., LDPE, mPE vie in flexible film market, Modern Plastics, pp. 23 and 25, Sep. 1994.

Product Literature, Dow Resins for Stretch Film Applications—The Dow Chemical Company, pp. 1.5–1.6, Oct. 1996.

Product Literature, Dow Skin Resins for Cast Stretch Film Applications, The Dow Chemical Company, pp. 3.1–3.2, Oct. 1994.

Product Literature, ENGAGE Polyolefin Elastomer for Industrial Collation Packaging (KC 8852), The Dow Chemical Company, 4 pages, Oct. 1994.

Product Literature, To give your customers' used stretch film a new lease on life, turn the page, Mobile Oil Corporation, 4 pages, 1993.

CLEAR HIGH MOLECULAR WEIGHT FILM

FIELD OF THE INVENTION

The present invention relates generally to polymer films. More particularly, the present invention relates to the use of particular polymers in films to improve gloss, haze and contact clarity of the films without compromising key structural characteristics.

BACKGROUND OF THE INVENTION

The films of the present invention are particularly adapted and useful in bags used for consumer self-packaging applications such as are common in the produce sections of supermarkets. Some of the properties desired of these films are as follows: puncture resistance, tear resistance and tensile strength in the transverse and machine directions, contact clarity, low haze, high gloss, the ability to produce the film in thin gauges, low specific gravity and thus high yield in area per pound, tensile toughness, and high modulus of elasticity. Of particular importance in the present application are film strength and clarity. Overall film strength is desirable so that the films may be employed with confidence in a number of different applications. Film clarity is desirable for two reasons. First, a clear film enables the user to easily see exactly what is inside the bag without opening the bag. Second, a clear film bolsters loss prevention efforts by supermarkets because the check-out clerks are able to view the contents of the bag and do not need to rely on the statements of the consumer or spend time inspecting the bag themselves.

A particular film is selected for an end use because of the particular properties it possesses and the film may have some properties which are desirable and others which are less so. For example, while a pure high molecular weight high density polyethylene (HMW HDPE) film has superior strength, toughness and puncture resistance, it has significant shortcomings with respect to gloss, haze and contact clarity. Metallocene-catalyzed polyethylene, while having superior gloss, haze and contact clarity, has only moderate tensile strength and significant cost limitations.

A need exists for films which have superior optical characteristics as well as excellent strength and puncture resistance. Such films could be used in a wider variety of end applications.

SUMMARY OF THE INVENTION

The present invention is a multilayered film which has both strength and clarity. The inventive film comprises first and second outer film layers, each of which comprises at least 40 weight percent of a polyethylene copolymer having a polydispersity ($M_w/M_n$ or MWD) of from about 1 to about 4, a density of from about 0.88 to about 0.94 g/cm$^3$, a melt index of from about 0.3 to about 10 g/10 min., and a melt flow ratio ($I_{20}/I_2$) of from about 12 to about 22. The first and second outer film layers are preferably produced utilizing metallocene catalyst polymerization techniques. The inventive multilayer film also possesses at least one inner film layer. At least one of the inner film layers comprises a high molecular weight high density polyethylene (HMW HDPE) polymer.

In a preferred embodiment, the first and second outer film layers are a metallocene-catalyzed polyethylene which is coextruded on each side of an inner film layer which is a HMW HDPE polymer having a melt index of less than about 0.1 g/10 min. and is a density of at least about 0.940 g/cm$^3$. Alternatively, the outside layers may contain a blend of metallocene-catalyzed polyethylene with either another polyolefin or a HMW HDPE polymer. The first and second outside layers may be prepared with the same or with different polymers.

The multilayer films of the present invention which are constructed with at least one inner film layer comprising a HMW HDPE film between first and second outer film layers of a low polydispersity polymer have been found to display superior optical properties compared to other film constructions without significant degradation of other key film properties. Individually, neither HMW HDPE films nor low polydispersity films meet the range of needs for applications such as bags. HMW HDPE films have poor clarity and high haze. Low dispersity polymer films such as metallocene-catalyzed polyethylene have low transverse direction tear and are expensive. The inventive multilayer films have improved gloss, haze, tear, contact clarity, and puncture resistance properties.

DETAILED DESCRIPTION OF THE INVENTION

The present invention sets forth multilayer thermoplastic films that are characterized by having a relatively low haze and a relatively high contact clarity, gloss, puncture resistance, high force to elongate, and reasonable tear resistance in both the transverse and machine directions—a combination of properties not possessed by any previous film.

The multilayer films of the present invention are constructed with at least one HMW HDPE polymer inner film layer between the first and second outer film layers. The HMW HDPE has a melt index of less than about 0.1 g/10 min. and a density of at least about 0.940 g/cm$^3$. Preferably, this inner film layer is composed solely of the HMW HDPE. Alternatively, the inner film layer may be composed of a blend of HMW HDPE and a low polydispersity polymer. If a blend is employed, the percentage of low polydispersity polymer is preferably no more than 35 wt. %.

The first and second outer film layers of the multilayer film of the present invention comprise a polymer resin having a low polydispersity. In a preferred embodiment, this low polydispersity polymer is prepared with ethylene in a major amount by weight and at least one alpha olefin monomer, e.g. a copolymer or terpolymer in the presence of a single-site or constrained geometry catalyst technology catalyst, in a minor amount by weight. The alpha olefin monomer generally has from 3 to about 12 carbon atoms, preferably from 4 to 10 carbon atoms, and more preferably from 6 to 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene. In a preferred embodiment the single-site catalyst is metallocene. The low polydispersity polymer used for the outer film layers generally has the characteristics associated with a linear low density polyethylene (LLDPE) material, however it has improved properties as explained more fully below. The low polydispersity polymer has a density of from about 0.88 to about 0.94 g/cm$^3$, preferably from about 0.88 to about 0.93 g/cm$^3$, and more preferably from about 0.88 to about 0.925 g/cm$^3$.

The weight average molecular weight of the low polydispersity polymer can generally range from about 20,000 to about 500,000, preferably from about 50,000 to about 200,000. The molecular weight is determined by commonly used techniques such as size exclusion chromatography or gel permeation chromatography. The low polydispersity polymer should have a molecular weight distribution, or polydispersity, ($M_w/M_n$, "MWD") within the range of about 1 to about 4, preferably about 1.5 to about 4, more preferably about 2 to about 4, and even more preferably from 2 to about 3. The ratio of the third moment to the second moment, $M_z/M_w$, is generally below 2.3, preferably below 2.0, and more typically in the range of from about 1.6 to about 1.95. The melt flow ratio of these resins, defined as $I_{20}/I_2$ and as determined in accordance with ASTM D-1238, is generally from about 12 to about 22, preferably from about 14 to about 20, and more preferably from about 16 to about 18. The melt index (MI), defined as the $I_2$ value, should be in the range of from about 0.3 to about 10 g/10 min., preferably from about 0.5 to about 2 g/10 min.

Useful low polydispersity polymers are available from, among others, Dow Chemical Company and Exxon Chemical Company who are producers of single site or constrained geometry catalyzed polyethylenes. These resins are commercially available as the AFFINITY and EXXACT polyethylenes (see *Plastics World*, p. 33–36, Jan. 1995), and also as the ENHANCED POLYETHYLENE and EXCEED line of resins. The manufacture of such polyethylenes, generally by way of employing a metallocene catalyst system, is set forth in, among others, U.S. Pat. Nos. 5,382,631, 5,380,810, 5,358,792, 5,206,075, 5,183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is hereby incorporated herein by reference in its entirety. These catalyst systems and their use to prepare such low polydispersity polymers are also set forth in EP 0 600 425 A1 and PCT applications WO 94/25271 and 94/26816. The polyethylene resins thus produced generally have a crystalline content in excess of at least 10 weight percent, generally in excess of at least 15 weight percent.

The above patents and publications generally report that these catalysts contain one or more cyclopentadienyl moieties in combination with a transition metal. The metallocene catalyst may be represented by the general formula $C_cMA_aB_b$ wherein C is a substituted or unsubstituted cyclopentadienyl ring; M is a Group 3–10 metal or Lanthanide series element, generally a Group IVB, VB, or VIB metal; A and B are independently halogen, hydrocarbyl group, or hydrocarboxyl groups having 1–20 carbon atoms; a=0–3, b=0–3, and c=1–3. The reactions can take place in either gas phase, high pressure, slurry, or solution polymerization schemes.

The first and second outer film layers of the multilayer film of the present invention are preferably constructed entirely with the low polydispersity polyethylene polymer, preferably produced through the metallocene catalyst technology. The first and/or second outer film layer may also comprise a blend of the low polydispersity polymer with a second resin material. The second resin material is preferably a LLDPE resin having a density of between about 0.89 and 0.94 g/cm³, a LDPE resin having a density of between about 0.9 and 0.935 g/cm³, a VLDPE resin having a density of between about 0.88 and 0.91 g/cm³ or up to about 20% of a HMW HDPE having a density of between about 0.941 and about 0.965 g/cm³. The comonomer for the second resin material preferably has from 4–10, more preferably 6–8 carbon atoms. If a second resin material is to be incorporated with the metallocene-catalyzed resin, it is preferred to maintain the level of the metallocene-catalyzed resin to at least 40 wt. %, preferably at least 50 wt. %, and more preferably at least 60 wt. %, of the blended resin film. The resultant blended polymer resin maintains the desired properties of the metallocene-catalyzed resin material and may be more economical for certain applications.

The films of the present invention can be constructed to contain a plurality of layers of the outer film layer and the inner film layer in various combinations. Generally, the film will be of an A/B/A construction wherein the film layers A are the outer film layers, and the film layer B is the inner film layer. In a preferred embodiment, pure metallocene-catalyzed polyethylene is coextruded on each side of a layer of pure HMW HDPE polymer. Alternatively, a blend of metallocene-catalyzed polyethylene and another polyolefin may be substituted for one or both of the outside outer film layers. In another alternative, a blend of metallocene-catalyzed polyethylene and HMW HDPE polymer may comprise the structural layer B. In any embodiment, it is preferred to keep the total weight percent of low polydispersity polymer in the film between about 10 weight percent and about 50 weight percent.

The films of the present invention have relatively high impact resistance, as measured by the F-50 dart drop test procedure (ASTM D1709). It is the experience of those skilled in the art that the F-50 dart drop test is well correlated to the end use impact resistance of films. The F-50 dart drop value of the films is at least about 550 g/mil, preferably at least about 600 g/mil, and more preferably from at least about 700 g/mil.

The films of the present invention are preferably constructed so that the overall transverse direction tear, as determined by ASTM D1922, is at least about 80 g/mil, preferably at least about 90 g/mil, more preferably at least about 100 g/mil.

The films of the present invention generally have a gloss of at least about 20% and a haze of below about 40%. In a preferred embodiment the film of the present invention has a gloss of at least about 35% and a haze of below about 25%.

The film configurations are constructed according to conventional practices. Generally, the preferred processing technique is to coextrude the films in a simultaneous fashion, however in some cases it may be appropriate to first coextrude at least two film layers and thereafter extrusion coat the remaining film layer. It is preferred to employ known and conventional techniques of coextrusion to assemble the composite structures of the films of this invention. Generally, the resin materials are heated to their molten state and their viscosities are coordinated to prepare multilayer films in a uniform manner. The molten materials are conveyed to a coextrusion adapter that combines the molten materials to form a multilayer coextruded structure. The layered polymeric material is transferred through an extrusion die opened to a predetermined gap commonly in the range of between about 0.05 in. (0.13 cm) and 0.12 in. (0.3 cm). The material is then drawn down to the intended gauge thickness by a machine direction draw down followed by a bubble inflation to reduce the film to the desired thickness and width. Typical draw down ratios range from about 10:1 to about 150:1.

The overall thickness of the film can vary widely according to end use specifications, but is generally in the range of the typical thicknesses for films. Conventional for such films is a thickness of from about 0.2 to about 2.0 mil, and is application specific.

In the present invention wherein the multilayer films are of a coextruded nature, it is preferred that the outer film layers combined comprise from about 5 wt. % to about 50 wt. %, and more preferably from about 20 wt. % to about 50 wt. %, of the total film weight. The inner film layer(s) will account for the balance of the film, and generally will comprise from about 50 wt. % to about 95 wt. % and more preferably from about 50 wt. % to about 80 wt. %, of the film.

EXAMPLE

The films of the present invention were tested using the following procedures:

| STRETCH FILM TEST PROCEDURES | |
|---|---|
| TEST PROCEDURE | ASTM TEST METHOD |
| Tensile Yield Machine Direction (MD) | D882 |
| Tensile Ultimate MD | D882 |
| Tensile Elongation MD | D882 |
| Tensile Force @ 200%, 250%, 300%, and 350% Stretch | D882 |
| Elmendorf Tear MD | D1922 |
| Elmendorf Tear Transverse Direction (TD) | D1922 |
| Total Energy Dart Drop | D4272 |
| F-50 Dart Drop | D1709 |
| Gardner Gloss | D2457 |
| Gardner Haze | D1003 |
| Instron Peel Cling | D5458 |
| Instron Probe Puncture Energy | — |

The probe energy test was conducted by use of an Instron Universal tester that records a continuous reading of the force (stress) and penetration (strain) curve. A 6 in. by 6 in. film specimen is securely mounted to a compression load cell to expose a 4 in. by 4 in. area. A hemispherically shaped (1 in. dia.) stainless steel probe, traveling at a constant speed of 10 in./min is lowered into the film. A stress/strain curve is recorded and plotted. Peak force is the maximum force encountered. The machine is used to integrate the area under the curve, which is indicative of the energy consumed during the penetration to rupture testing of the film.

The results of the tests appear in Tables 1, 2 and 3. The films tested were three-layer films having the composition indicated in the Tables. The outer film layers of each film were metallocene-catalyzed low polydispersity polyethylene polymers. These polymers are described in terms of the weight percent of the layer in the total weight of the film and the melt index of that polymer (e.g. "15% 1 MI" denotes a film having 15 wt. % metallocene-catalyzed low polydispersity polymer and a melt index of 1). "HMW" refers to high molecular weight HDPE polymer. In Table 1, the inner film layer of each film is "HMW" or 100% HMW HDPE polymer film. In Table 1, the inner film layer of HMW HDPE polymer occupied 70 weight percent of the film. In Table 2, the inner film layer comprised 70 weight percent of the film. This inner film layer was a blend of HMW HDPE polymer and metallocene-catalyzed polyethylene. The composition of this layer is shown in weight percent of each component in each layer and does not have any reference to the overall film composition. The HMW HDPE polymer in each example had a polydispersity of from about 140 to about 180, a melt index of about 0.045 g/10 min. and a density of about 0.952 g/cm$^3$.

As can be seen from a comparison of Columns 1 and 2 of Table 1, the addition of outer film layers of metallocene-catalyzed polyethylene significantly improve the optics of the film. Further, while the film did lose some degree of overall strength, this loss of strength is not of consequence because the layered film is still sufficiently strong to be used in the numerous applications.

Table 2 shows that a blend in the inner layer of the inventive film improved the optics (i.e., the % haze was considerably decreased) with films made from both the 1 g/10 min. MI and the 3 g/10 min. MI low polydispersity resins. In addition, the inventive films show improvement in MDPPT and significant improvement in MD Ultimate strength over the control HMW-only film.

Table 3 reports measurements for films prepared using a lower melt index (0.5 g/10 min. MI) low polydispersity polyethylene resin. The data show improvement in both haze and gloss with a significant increase in the puncture and dart drop values of the coextruded film.

TABLE 1

| | | | | Sample # | | | | |
|---|---|---|---|---|---|---|---|---|
| | Layer | 1a | 2 | 3 | 4 | 5 | 6 | 7 |
| Composition | 1 | HMW | 15% 1 MI | 15% 1 MI | 15% 2 MI | 15% 2 MI | 15% 3 MI | 15% 3 MI |
| of | 2 | HMW | HMW | HMW | HMW | HMW | HMW | HMW |
| Film Layer | 3 | HMW | 15% 1 MI | 15% 1 MI | 15% 2 MI | 15% 2 MI | 15% 3 MI | 15% 3 MI |
| Gauge, mil | | 0.79 | 0.7 | 0.3 | 0.77 | 0.35 | 0.71 | 0.29 |
| MD Tear, g/mil | | 16 | 17 | 16 | 16 | 11 | 16 | 17 |
| TD Tear, g/mil | | 202 | 129 | 131 | 140 | 136 | 147 | 133 |
| MD Yield, PSI | | 4629 | 3824 | 5165.3 | 3982 | 4989 | 3708 | 5094 |
| MD Ultimate, PSI | | 11480 | 9646 | 11683.3 | 9522 | 115590 | 9301 | 10300 |
| MD Elongation, % | | 390 | 364 | 258.3 | 354 | 287 | 353 | 219 |
| MD Toughness | | 2345 | 1825 | 1734.3 | 1776 | 1900 | 1724 | 1382 |
| TD Yield, PSI | | 4388 | 3475 | 3949 | 3508 | 3597 | 3411 | 3921 |
| TD Ultimate, PSI | | 5787 | 5198 | 6257.7 | 5355 | 5433 | 5566 | 6031 |
| TD Elongation, % | | 504 | 517 | 447.7 | 510 | 478 | 522 | 429 |
| TD Toughness | | 1585 | 1342 | 1434.3 | 1375 | 1345 | 1422 | 1375 |
| MDPPT, g/mil | | 2070 | 2286 | 3208 | 2185 | 2959 | 2183 | 2739 |
| Dart, F50, g | | 211 | 197 | 212 | 185 | 140 | 143 | 134 |
| TEDD, lbs/mil | | 23 | 23.9 | 60.6 | 18.3 | 35.5 | 21.4 | 41.5 |
| Haze, % | | 76.6 | 24.2 | 38.5 | 31.4 | 42.9 | 34.6 | 47.7 |
| Gloss, % | | 8.8 | 43.4 | 29.2 | 32.3 | 25.3 | 31.5 | 20.8 |

MDPPT = machine direction probe propagation tear
TEDD = total energy dart drop

TABLE 2

| | Sample # | | | | | | | |
|---|---|---|---|---|---|---|---|---|
| | 1b | 8 | 9 | 10 | 11 | 12 | 13 | 14 |
| Outer Layer - Resin | HMW | 1 MI | 1 MI | 1 MI | 1 MI | 3 MI | 3 MI | 3 MI |
| % of total bag | 15 | 15 | 15 | 15 | 15 | 15 | 15 | 15 |
| Core Layer - Resin | HMW | 95% HMW/ 5% 1 MI | 90% HMW/ 10% 1 MI | 80% HMW/ 20% 1 MI | 70% HMW/ 30% 1 MI | 95% HMW/ 5% 3 MI | 90% HMW/ 10% 3 MI | 80% HMW/ 20% 3 MI |
| % of total bag | 70 | 70 | 70 | 70 | 70 | 70 | 70 | 70 |
| Inner Layer - Resin | HMW | 1 MI | 1 MI | 1 MI | 1 MI | 3 MI | 3 MI | 3 MI |
| % of total bag | 15 | 15 | 15 | 15 | 15 | 15 | 15 | 15 |
| Gauge, mil | 0.75 | 0.3 | 0.28 | 0.3 | 0.27 | 0.3 | 0.34 | 0.32 |
| MD Tear, g/mil | 18 | 18 | 16 | 15 | 25 | 14 | 13 | 18 |
| TD Tear, g/mil | 179 | 163 | 161 | 179 | 262 | 138 | 167 | 289 |
| MD Yield, PSI | 4478 | 4586 | 4675 | 4587 | 3989 | 4941 | 4399 | 3903 |
| MD Ultimate, PSI | 11110 | 12320 | 12840 | 12870 | 12210 | 12350 | 10500 | 11080 |
| MD Elongation, % | 379 | 315 | 288 | 295 | 306 | 297 | 266 | 330 |
| MD Toughness | 2232 | 2049 | 1993 | 2028 | 1936 | 2012 | 1613 | 1903 |
| TD Yield, PSI | 4287 | 4020 | 4355 | 3793 | 3337 | 3819 | 3531 | 3282 |
| TD Ultimate, PSI | 652 | 6071 | 6152 | 6174 | 5937 | 5819 | 4854 | 4439 |
| TD Elongation, % | 519 | 479 | 407 | 492 | 506 | 451 | 479 | 498 |
| TD Toughness | 1744 | 1493 | 1371 | 1476 | 1368 | 1416 | 1294 | 1237 |
| MDPPT, g/mil | 1952 | 3180 | 3260 | 3353 | 3320 | 3080 | 3165 | 3087 |
| Dart, F50, g | 212 | 132 | 122 | 98 | 103 | 140 | 106 | 67 |
| TEDD, lbs/mil | 22.9 | 47.9 | 39 | 30.6 | 29.4 | 28.3 | 25.2 | 22.3 |
| Haze, % | 78.8 | 29.2 | 29.2 | 25.9 | 18.1 | 40.1 | 38.6 | 35.6 |
| Gloss, % | 7.4 | 34 | 35.3 | 39 | 51.9 | 25.6 | 27.5 | 30.5 |

MDPPT = machine direction probe propagation tear
TEDD = total energy dart drop

TABLE 3

| | Sample | | | | | | | | | | |
|---|---|---|---|---|---|---|---|---|---|---|---|
| | 1c | 10 | 16 | 14 | 13 | 11 | 15 | 9 | 12 | 17 | 18 |
| Outer Layer - Resin | HMW | 1 MI | 1 MI | 1 MI | 0.5 MI | 0.5 MI | 0.5 MI | 0.5 MI | 0.5 MI | 70% 1 MI/ 30% HMW | 70% 0.5 MI/ 30% HMW |
| % of total bag | 15 | 15 | 20 | 25 | 15 | 20 | 15 | 20 | 25 | 15 | 15 |
| Core Layer - Resin | HMW | HMW | HMW | HMW | HMW | HMW | HMW | HMW | HMW | 70% 1 MI/ 30% HMW | 70% 0.5 MI/ 30% HMW |
| % of total bag | 70 | 70 | 60 | 50 | 70 | 60 | 70 | 60 | 50 | 70 | 70 |
| Inner Layer - Resin | HMW | 1 MI | 1 MI | 1 MI | 0.5 MI | 0.5 MI | 0.5 MI | 0.5 MI | 0.5 MI | 70% 1 MI/ 30% HMW | 70% 0.5 MI/ 30% HMW |
| % of total bag | 15 | 15 | 20 | 25 | 15 | 20 | 15 | 20 | 25 | 15 | 15 |
| Gauge, mil | 0.30 | 0.30 | 0.30 | 0.30 | 0.30 | 0.30 | 0.30 | 0.30 | 0.30 | 0.30 | 0.30 |
| MD Tear, g | 5 | 6 | 7 | 8 | 5 | 7 | 7 | 5 | 6 | 4 | 5 |
| TD Tear, g | 26 | 43 | 34 | 34 | 35 | 26 | 58 | 43 | 35 | 149 | 134 |
| MD Yield, lbs. | 1.6 | 1.7 | 1.5 | 1.4 | 1.4 | 1.5 | 1.5 | 1.5 | 1.3 | 1.4 | 1.6 |
| MD Ultimate, lbs. | 3.1 | 3.9 | 3.1 | 2.9 | 2.7 | 3.1 | 3 | 2.8 | 2.6 | 3.4 | 3.6 |
| MD Elongation, % | 256 | 303 | 259 | 255 | 234 | 249 | 248 | 251 | 236 | 282 | 250 |
| MD Toughness | 1791 | 1889 | 1415 | 1220 | 1414 | 1481 | 1551 | 1214 | 1263 | 1845 | 1588 |
| MDPPT, cm | 7.2 | 5.6 | 5.9 | 5.1 | 5.8 | 5.4 | 5.9 | 6 | 5.8 | 6.3 | 6.3 |
| Dart, F50, g | 149 | 235 | 238 | 241 | 202 | 199 | 224 | 214 | 175 | 82 | 53 |
| TEDD, in-lbs. | 10.6 | 12.3 | 16 | 15.5 | 14.2 | 16.1 | 10.7 | 13.1 | 10.5 | 4.4 | 5.1 |
| Puncture, lbs. | 2.8 | 3.9 | 4.6 | 4.7 | 4.4 | 4.8 | 3.7 | 3.9 | 4.3 | 3.2 | 3.5 |
| Blocking, as is, g | 8.9 | 12.6 | 16 | 25.4 | 13 | 15.6 | 13.5 | 15.7 | 16.4 | 12.4 | 11.5 |
| Aged Blocking, as is, g | 9.7 | 13 | 18.1 | 29 | 12.1 | 16 | 11.6 | 17.9 | 21.7 | 12.6 | 11.6 |
| Haze, % | 59.3 | 35.2 | 22.1 | 17.4 | 35.2 | 31.4 | 33.1 | 19.1 | 22.3 | 53.2 | 58.2 |
| Gloss, % | 12.3 | 23.7 | 36 | 46.5 | 24 | 29.2 | 25.7 | 46.4 | 43.6 | 13.4 | 12.4 |

MDPPT = machine direction probe propagation tear
TEDD = total energy dart drop

Either or both of the outer film layers of the film can be treated by such known and conventional post-forming operations as corona discharge, chemical treatment, flame treatment, etc., to modify the printability or ink receptivity of the surface(s) or to impart other desirable characteristics thereto.

What is claimed is:

1. A multilayer, thermoplastic film comprising:

(a) a first outer film layer comprising a polyethylene copolymer, said polyethylene copolymer having a polydispersity of from about 1 to about 4, a density of from about 0.88 to about 0.94 g/cm$^3$, a melt index of from about 0.3 to about 10 g/10 min., and a melt flow ratio ($I_{20}/I_2$) of from about 12 to about 22;

(b) a second outer film layer comprising a polyethylene copolymer, said polyethylene copolymer having a polydispersity of about 1 to about 4, a density of from about 0.88 to about 0.94 g/cm$^3$, a melt index of from about 0.3 to about 10 g/10 min., and a melt flow ratio ($I_{20}/_2$) of from about 12 to about 22;

(c) an inner film layer, located between the first outer film layer and the second outer film layer, the inner film layer comprising a polyethylene polymer, said polyethylene polymer having a melt index of less than 0.1 g/10 min. and a density of at least 0.940 g/cm$^3$;

wherein the film has a haze of below 40% as determined by ASTM D1003, a gloss of at least 20% as determined by ASTM D2457, an overall transverse direction tear of at least 80 g/mil as determined by ASTM D1922, and an F-50 dart drop value of at least 550 g/mil as determined by ASTM D1709.

2. The thermoplastic film of claim 1 wherein the polydispersity of the polyethylene copolymer in at least one of the outer film layers is in the range of from about 1.5 to about 4.

3. The thermoplastic film of claim 2 wherein the polydispersity of the polyethylene copolymer in at least one of the outer film layers is in the range of from about 2 to about 4.

4. The thermoplastic film of claim 3 wherein the polydispersity of the polyethylene copolymer in at least one of the outer film layers is in the range of from about 2 to about 3.

5. The thermoplastic film of claim 1 wherein the density of the polyethylene copolymer in at least one of the outer film layers is in the range of from about 0.88 to about 0.93 g/cm$^3$.

6. The thermoplastic film of claim 5 wherein the density of the polyethylene copolymer in at least one of the outer film layers is in the range of from about 0.88 to about 0.925 g/cm$^3$.

7. The thermoplastic film of claim 1 wherein the melt index of the polyethylene copolymer in at least one of the outer film layers is in the range of from about 0.5 to about 5 g/10 min.

8. The thermoplastic film of claim 7 wherein the melt index of the polyethylene copolymer in at least one of the outer film layers is in the range of from about 0.5 to about 2 g/10 min.

9. The thermoplastic film of claim 1 wherein the melt flow ratio of the polyethylene copolymer in the first outer film layer and the second outer film layer is in the range of from about 14 to about 20.

10. The thermoplastic film of claim 9 wherein the melt flow ratio of the polyethylene copolymer in the first outer film layer and the second outer film layer is in the range of from about 16 to about 18.

11. The thermoplastic film of claim 1 wherein the first outer film layer and the second outer film layer are constructed of the same copolymer.

12. The thermoplastic film of claim 1 wherein at least one of the outer film layers comprises a polyethylene copolymer having a weight average molecular weight in the range of from about 20,000 to about 500,000.

13. The thermoplastic film of claim 12 wherein at least one of the outer film layers comprises a polyethylene copolymer having a weight average molecular weight in the range of from about 50,000 to about 200,000.

14. The thermoplastic film of claim 1 wherein the polyethylene copolymer of at least one of the outer film layers is made with a metallocene catalyst.

15. The thermoplastic film of claim 1 wherein the overall transverse direction tear is at least 90 g/mil.

16. The thermoplastic film of claim 1 wherein the F-50 dart drop value is at least about 600 g/mil.

17. The thermoplastic film of claim 1 wherein the thermoplastic film comprises from about 5 wt. % to 50 wt. % of the outer film layers combined.

18. The thermoplastic film of claim 17 wherein the thermoplastic film comprises from about 20 wt. % to about 50 wt. % of the outer film layers combined.

19. The thermoplastic film of claim 1 wherein at least one of the outer film layers comprises a polymer of two or more monomers, wherein a first monomer is ethylene, in a major amount by weight, and a second monomer is an alpha olefin of from about 3 to about 12 carbon atoms, in a minor amount by weight.

20. The thermoplastic film of claim 1 wherein at least one of the outer film layers is a blend of polymers comprising at least 40 wt. % of the polyethylene copolymer.

21. The thermoplastic film of claim 1 wherein the second outer film layer is a blend of polymers comprising no more than 60 wt. % of a second resin material.

22. The thermoplastic film of claim 21 wherein the second resin material is chosen from the group consisting of a linear low density polyethylene resin having a density of between about 0.89 and 0.94 g/cm$^3$, a low density polyethylene resin having a density of between about 0.9 and 0.935 g/cm$^3$, and a very low density polyethylene resin having a density of between about 0.88 and 0.91 g/cm$^3$, or less than or equal to about 20% of a second resin material consisting of a polyethylene polymer having a density of between about 0.941 and about 0.965 g/cm$^3$.

23. The thermoplastic film of claim 1 wherein
(a) the first outer film layer consists essentially of a polyethylene copolymer, said polyethylene copolymer having a polydispersity of from about 1 to about 4, a density of from about 0.88 to about 0.94 g/cm$^3$, a melt index of from about 0.3 to about 10 g/10 min., and a melt flow ratio ($I_{20}/I_2$) of from about 12 to about 22;
(b) the second outer film layer consists essentially of a polyethylene copolymer, said polyethylene copolymer having a polydispersity of about 1 to about 4, a density of from about 0.88 to about 0.94 g/cm$^3$, a melt index of from about 0.3 to about 10 g/10 min., and a melt flow ratio ($I_{20}/I_2$) of from about 12 to about 22; and
(c) the inner film layer consists essentially of a polyethylene polymer, said polyethylene polymer having a melt index of less than 0.1 g/10 min. and a density of at least 0.940 g/cm$^3$.

24. The thermoplastic film of claim 23 wherein the polyethylene copolymer in the first outer film layer and the second outer film layer has a melt index of from about 0.3 to about 5 g/10 min.

25. The thermoplastic film of claim 24 wherein the polyethylene copolymer in the first outer film layer and the second outer film layer has a melt index of from about 0.3 to about 2 g/$_{10}$ min.

26. The thermoplastic film of claim 1 wherein said polyethylene polymer has a density from about 0.941 to about 0.965 g/cm$^3$.

27. The thermoplastic film of claim 1 wherein said polyethylene polymer has a melt index of about 0.045 g/10 min.

28. The thermoplastic film of claim 1 wherein said polyethylene polymer has a polydispersity of from about 140 to about 180.

29. A multilayer, thermoplastic film comprising:
(a) a first outer film layer comprising a low polydispersity polyethylene copolymer, said low polydispersity polyethylene copolymer having a polydispersity of from about 1 to about 4, a density of from about 0.88 to about 0.94 g/cm$^3$, a melt index of from about 0.3 to about 10 g/10 min., and a melt flow ratio ($I_{20}/I_2$) of from about 12 to about 22;

(b) a second outer film layer comprising a low polydispersity polyethylene copolymer, said low polydispersity polyethylene copolymer having a polydispersity of about 1 to about 4, a density of from about 0.88 to about 0.94 g/cm$^3$, a melt index of from about 0.3 to about 10 g/10 min., and a melt flow ratio ($I_{20}/I_2$) of from about 12 to about 22;

(c) an inner film layer, located between the first outer film layer and the second outer film layer, the inner film layer comprising a polyethylene polymer, said polyethylene polymer having a melt index of less than 0.1 g/0.1 min., a melt flow rate of from about 140 to about 180, and a density of at least 0.940 g/cm$^3$;

wherein the film has a haze of below 40% as determined by ASTM D1003, a gloss of at least 20% as determined by ASTM D2457, an overall transverse direction tear of at least 80 g/mil as determined by ASTM D1922, and an F-50 dart drop value of at least 550 g/mil as determined by ASTM D1709.

30. The thermoplastic film of claim 29 wherein the density of the polyethylene polymer is from about 0.941 to about 0.965 g/cm$^3$.

31. The thermoplastic film of claim 29 wherein the polyethylene polymer has a melt index of about 0.045 g/10 min.

32. The thermoplastic film of claim 29 wherein the polydispersity of the polyethylene copolymer in the first outer film layer and the second outer film layer is in the range of from about 2 to about 3.

33. The thermoplastic film of claim 29 wherein the polyethylene copolymer of the first outer film layer and the second outer film layer is made with a metallocene catalyst.

34. The thermoplastic film of claim 29 wherein the thermoplastic film comprises from about 5 wt. % to about 50 wt. % of the outer film layers combined.

35. The thermoplastic film of claim 29 wherein the polyethylene copolymer of the first film layer is a polymer which comprises two or more monomers, wherein a first monomer is ethylene, in a major amount by weight, and a second monomer is an alpha olefin of from about 3 to about 12 carbon atoms, in a minor amount by weight.

\* \* \* \* \*